US012776499B2

(12) United States Patent
Hänisch et al.

(10) Patent No.: US 12,776,499 B2
(45) Date of Patent: Oct. 27, 2026

(54) VALVE AND A FUEL CELL SYSTEM INCORPORATING THE VALVE

(71) Applicant: Purem GmbH, Neunkirchen (DE)

(72) Inventors: Jan Hänisch, Neuhausen (DE); Matthias Grün, Altbach (DE); Andreas Wacker, Plochingen (DE); Milijenko Novosel, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 12 days.

(21) Appl. No.: 18/972,613

(22) Filed: Dec. 6, 2024

(65) Prior Publication Data

US 2025/0192197 A1 Jun. 12, 2025

(30) Foreign Application Priority Data

Dec. 8, 2023 (DE) ..................... 10 2023 134 378.5
Jan. 17, 2024 (DE) ..................... 10 2024 101 222.6

(51) Int. Cl.
*F16K 1/20* (2006.01)
*F16K 1/226* (2006.01)
*H01M 8/04089* (2016.01)

(52) U.S. Cl.
CPC ....... *H01M 8/04089* (2013.01); *F16K 1/2263* (2013.01); *F16K 1/2057* (2013.01); *F16K 1/2064* (2013.01); *F16K 1/2265* (2013.01)

(58) Field of Classification Search
CPC .... F16K 1/2057; F16K 1/2064; F16K 1/2263; F16K 1/2265
See application file for complete search history.

(56) References Cited

U.S. PATENT DOCUMENTS 10,400,897 B2 * 9/2019 Geyer .................... B23P 15/001
10,862,147 B2 * 12/2020 Yoshioka .......... H01M 8/04104
(Continued)

FOREIGN PATENT DOCUMENTS

CN 218564415 U 3/2023
DE 11 2018 003 561 T5 3/2020
(Continued)

OTHER PUBLICATIONS

English translation of Office action of the Korean Patent Office dated Apr. 14, 2026 in corresponding Korean patent application 10-2024-0181904.

*Primary Examiner* — Kevin F Murphy
(74) *Attorney, Agent, or Firm* — Walter Ottesen, P.A.

(57) ABSTRACT

A valve includes a discoid valve element pivotable between open and closed positions. On an outer circumferential region of the valve element, an annular valve-element sealing face is provided, and an annular valve seat surrounds a valve opening. On an inner circumferential region of the valve seat, a valve-seat sealing face annularly surrounding a valve-opening center axis is provided and is in contact with the valve-element sealing face in the closed position. The valve seat includes a support element and an annular valve-seat sealing element supported thereon. The sealing face is on the sealing element. The support element includes a body portion supporting it preventing movement radially outward relative to the center axis. The sealing element includes, on one axial side of the body portion, a sealing portion protruding beyond the body portion axially relative to the center axis. The entire sealing face is formed on the sealing portion.

14 Claims, 4 Drawing Sheets

(56) References Cited

U.S. PATENT DOCUMENTS

| | | | | |
|---|---|---|---|---|
| 2018/0010699 | A1* | 1/2018 | Mishima | F16K 5/181 |
| 2020/0173562 | A1 | 6/2020 | Itahara et al. | |
| 2022/0170553 | A1 | 6/2022 | Itahara et al. | |
| 2022/0364649 | A1 | 11/2022 | Miyashita et al. | |
| 2023/0304583 | A1 | 9/2023 | Hashiba et al. | |

FOREIGN PATENT DOCUMENTS

| | | | |
|---|---|---|---|
| DE | 11 2021 003 548 | T5 | 4/2023 |
| DE | 10 2021 212 267 | A1 | 5/2023 |
| JP | 2019-019975 | A | 2/2019 |
| JP | 2020-70874 | A | 5/2020 |
| JP | 2022-21969 | A | 2/2022 |
| JP | 2023-82499 | A | 6/2023 |
| KR | 10-2022-0093140 | A | 7/2022 |

* cited by examiner

VALVE AND A FUEL CELL SYSTEM INCORPORATING THE VALVE

CROSS-REFERENCE TO RELATED APPLICATIONS

This application claims priority of German patent application nos. 10 2023 134 378.5, filed Dec. 8, 2023, and 10 2024 101 222.6, filed Jan. 17, 2024; the entire contents of both are incorporated herein by reference.

TECHNICAL FIELD

The present disclosure relates to a valve, in particular for a fuel cell system, including a discoid valve element which can be pivoted about a pivot axis between an open position and a closed position, wherein, on an outer circumferential region of the valve element, an annular valve-element sealing face is provided, and an annular valve seat which surrounds a valve opening, wherein, on an inner circumferential region of the valve seat, a valve-seat sealing face is provided which annularly surrounds a valve-opening center axis and which is in contact with the valve-element sealing face when the valve element is in the closed position, wherein the valve seat includes an annular valve-seat support element and an annular valve-seat sealing element supported on the valve-seat support element, wherein the valve-seat sealing face is provided on the valve-seat sealing element, wherein the valve-seat support element includes a support-element body portion which supports the valve-seat sealing element to prevent movement radially outward with respect to the valve-opening center axis, wherein the valve-seat sealing element includes, on one axial side of the support-element body portion, a sealing portion which protrudes beyond the support-element body portion axially with respect to the valve-opening center axis.

BACKGROUND

A valve of this type configured as a doubly eccentric valve is known from DE 11 2018 003 561 T5. In this valve, the valve-seat sealing face of the support-element body portion of the valve-seat support element is positioned in the direction of the valve-opening center axis such that approximately half of the axial extent of the valve-seat sealing face is formed on the sealing portion of the valve-seat sealing element, which sealing portion protrudes axially beyond the support-element body portion, and the remaining part of the valve-seat sealing face axially overlaps with the support-element body portion.

SUMMARY

It is the object of the present disclosure to provide a valve, in particular for a fuel cell system, which has an improved sealing effect together with reduced wear on the valve-seat sealing element.

This object is achieved according to the disclosure by a valve, in particular for a fuel cell system, including:

- a discoid valve element which can be pivoted about a pivot axis between an open position and a closed position, wherein, on an outer circumferential region of the valve element, an annular valve-element sealing face is provided,
- an annular valve seat which surrounds a valve opening, wherein, on an inner circumferential region of the valve seat, a valve-seat sealing face is provided which annularly surrounds a valve-opening center axis and which is in contact with the valve-element sealing face when the valve element is in the closed position, wherein the valve seat includes an annular valve-seat support element and an annular valve-seat sealing element supported on the valve-seat support element, wherein the valve-seat sealing face is provided on the valve-seat sealing element, wherein the valve-seat support element includes a support-element body portion which supports the valve-seat sealing element to prevent movement radially outward with respect to the valve-opening center axis, wherein the valve-seat sealing element includes, on one axial side of the support-element body portion, a sealing portion which protrudes beyond the support-element body portion axially with respect to the valve-opening center axis.

The valve configured according to the disclosure is characterized in that essentially the entire valve-seat sealing face is formed on the sealing portion.

In the valve configured according to the disclosure, the positioning of the valve-seat sealing face in a region axially offset with respect to the support-element body portion has the effect that there is essentially no axial overlap between the valve-seat sealing face and the support-element body portion, which bears the valve-seat sealing element and generally also supports the valve-seat sealing element to prevent movement radially outward. As a result, the region of the valve-seat sealing element that interacts with the valve element or with the valve-element sealing face to create a sealing effect is essentially not blocked by the support-element body portion to prevent movement radially outward. As a result, during the establishing and ending of the sealing interaction between the valve-element sealing face and the valve-seat sealing face, the valve-seat sealing element, which is generally made of elastic material, such as rubber material, can be more easily deformed, and the valve-seat sealing element can better nestle against the outer circumferential contour of the valve element in the region of the valve-element sealing face during the establishing of the sealing interaction and when the valve element is in the closed position.

To achieve an axially compact configuration, the valve-seat sealing face can axially directly adjoin the support-element body portion.

To allow even better deformability of the valve-seat sealing element, the valve-seat sealing face can be arranged at an axial distance from the support-element body portion.

The blocking of the valve-seat sealing element by the support-element body portion to prevent movement radially outward can be reduced as a result of an axial length of extent of the support-element body portion being less than a maximum axial length of extent of the valve-seat support element.

The valve-seat support element can be supported in a valve housing, through which gas can flow when the valve element is in the open position.

For stable positioning of the valve-seat support element in the valve housing, the valve-seat support element can be held in the valve housing by press fit and/or material bonding.

In particular when the valve-seat support element is held in the valve housing by press fit, it is proposed that, in order to facilitate the establishment of the press fit during the insertion of the valve-seat support element into the valve housing, a chamfer is provided on the valve housing and/or on an outer circumferential region of the valve-seat support element in at least one axial end region.

In order to achieve a doubly eccentric positioning of the valve element that reduces the load on the valve-seat sealing element during opening and closing of the valve, it is proposed that the pivot axis is radially offset with respect to the valve-opening center axis and is offset axially in the direction of the valve-opening center axis with respect to the valve-seat sealing face.

To achieve a stable configuration, the valve-seat support element can be made of rigid material, preferably metal material or plastic material, in particular hard plastic. A good sealing effect can be achieved in particular when the valve-seat sealing element is made of elastic material, preferably rubber material.

For a stable connection of the valve-seat support element to the valve-seat sealing element, one element of the valve-seat support element and the valve-seat sealing element can include at least two protrusions which are arranged at a distance from one another in the direction of the valve-opening center axis and which protrude radially toward the other element of the valve-seat support element and the valve-seat sealing element and which form a recess between themselves, and the other element of the valve-seat support element and the valve-seat sealing element can include, in association with the recess, a protrusion which engages in the recess. In the region of such radially mutually engaging protrusions and recesses, the valve-seat support element and the valve-seat sealing element can be stably connected to one another, for example by material bonding, such as gluing, vulcanization or molding-on.

In order to minimize, during movement of the valve element between its open position and its closed position, the frictional interaction with the valve-seat sealing element, it is proposed that the valve element is, at least in its surface region that comes into contact with the valve-seat sealing element, made of friction-reducing material, preferably PTFE material, that is, material known under the registered trademark or the tradename Teflon, at least in parts.

The disclosure also relates to a fuel cell system including a fuel cell unit and at least one valve configured according to the disclosure for selectively blocking and releasing a gas flow to and/or from the fuel cell unit.

The fuel cell unit can include an anode region, having an anode-gas feed region and an anode-exhaust-gas discharge region, and a cathode region, having a cathode-gas feed region and a cathode-exhaust-gas discharge region. In order to be able to regulate in a defined way in particular the relatively large gas streams to and from the cathode region or to be able to close off the cathode region essentially gas-tight, the cathode-gas feed region can include a valve configured according to the disclosure and/or the cathode-exhaust-gas discharge region can include a valve configured according to the disclosure.

BRIEF DESCRIPTION OF DRAWINGS

The invention will now be described with reference to the drawings wherein.

DETAILED DESCRIPTION

Figure 1:
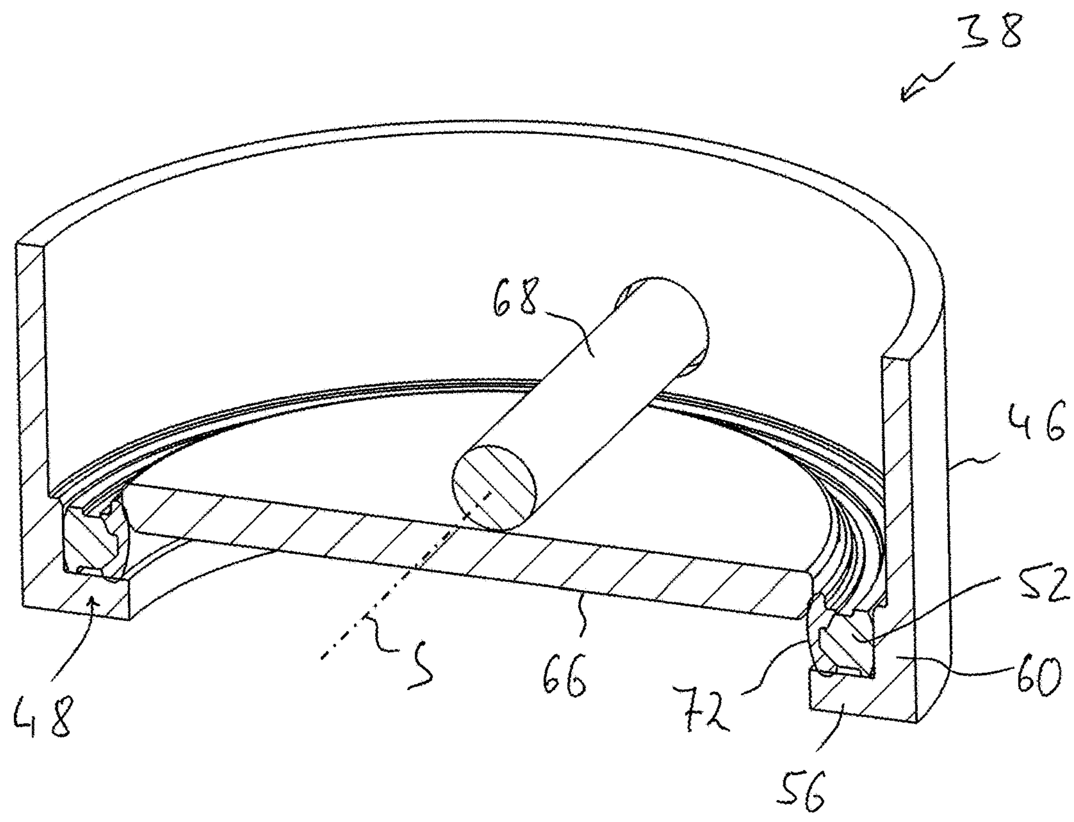
FIG. 1 is a perspective longitudinal-section view of a valve that can be used in a fuel cell system, a valve element of which valve is in a closed position.

Before the configuration of a valve which can be used, for example, in connection with a fuel cell system is described in detail below with reference to FIGS. 1 to 7, the basic configuration of such a fuel cell system which can be used, for example, in a vehicle to generate electrical energy is first described with reference to FIG. 8.

The fuel cell system 10 includes a fuel cell unit 12 which, for example, is constructed with a plurality of fuel cell stacks and which has an anode region 14 and a cathode region 16. An anode-gas feed region 18 includes an anode-gas feed line 20, by means of which gaseous hydrogen or a gas containing hydrogen can be fed into the anode region 14. An anode-exhaust-gas discharge region 22 includes an anode-exhaust-gas discharge line 24, by means of which hydrogen-depleted anode exhaust gas can exit the anode region 14. The anode-gas feed line 20 and the anode-exhaust-gas discharge line 24 can be provided with one associated shut-off element 26, 28 each, by means of which the gas stream to and from the anode region 14 can be regulated or the anode region 14 can be closed off gas-tight.

A cathode-gas feed region 30 includes a cathode-gas feed line 32, by means of which oxygen-containing gas, for example air, can be introduced into the cathode region 16. A cathode-exhaust-gas discharge region 34 includes a cathode-exhaust-gas discharge line 36, by means of which oxygen-depleted cathode exhaust gas containing water or water vapor can be discharged from the cathode region 16.

The cathode-gas feed line 32 and the cathode-exhaust-gas discharge line 36 are provided with one associated valve 38, 40 each, by means of which the gas stream to or from the cathode region 16 can be regulated and the cathode region 16 can be closed off essentially gas-tight.

Figure 8:
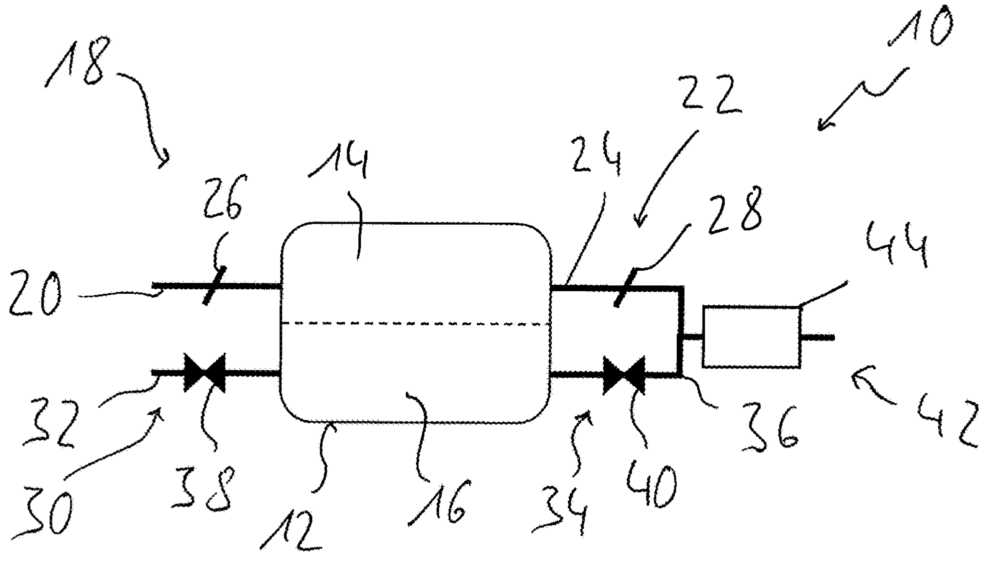

FIG. 8 also illustrates that the anode-exhaust-gas discharge line 24 and the cathode-exhaust-gas discharge line 36 can, for example, be merged downstream of the shut-off element 28 and the valve 40, respectively, in order to introduce the anode exhaust gas and the cathode exhaust gas, as a fuel-cell exhaust gas stream, into a fuel-cell exhaust gas unit 42. In the fuel-cell exhaust gas unit 42, the fuel-cell exhaust gas stream can be further treated. For example, various system regions 44 which contribute to the condensing out and removal of water contained in the fuel-cell exhaust gas stream can be provided. The system regions 44 can include, for example, a sound damper for damping the transport of noises generated in the fuel cell system 10 to the outside via the fuel-cell exhaust gas.

It should be noted that the fuel cell system can in principle also be configured differently, in particular also depending on the fuel cell type which is used.

Below, the configuration of a valve 38 or 40 advantageously to be used in connection with the cathode region 16 is described. Reference is made to the valve 38, and it should be emphasized that the valve 40 can be configured in the same way as the valve 38 described in detail below initially with reference to FIGS. 1 to 6.

Figure 2:
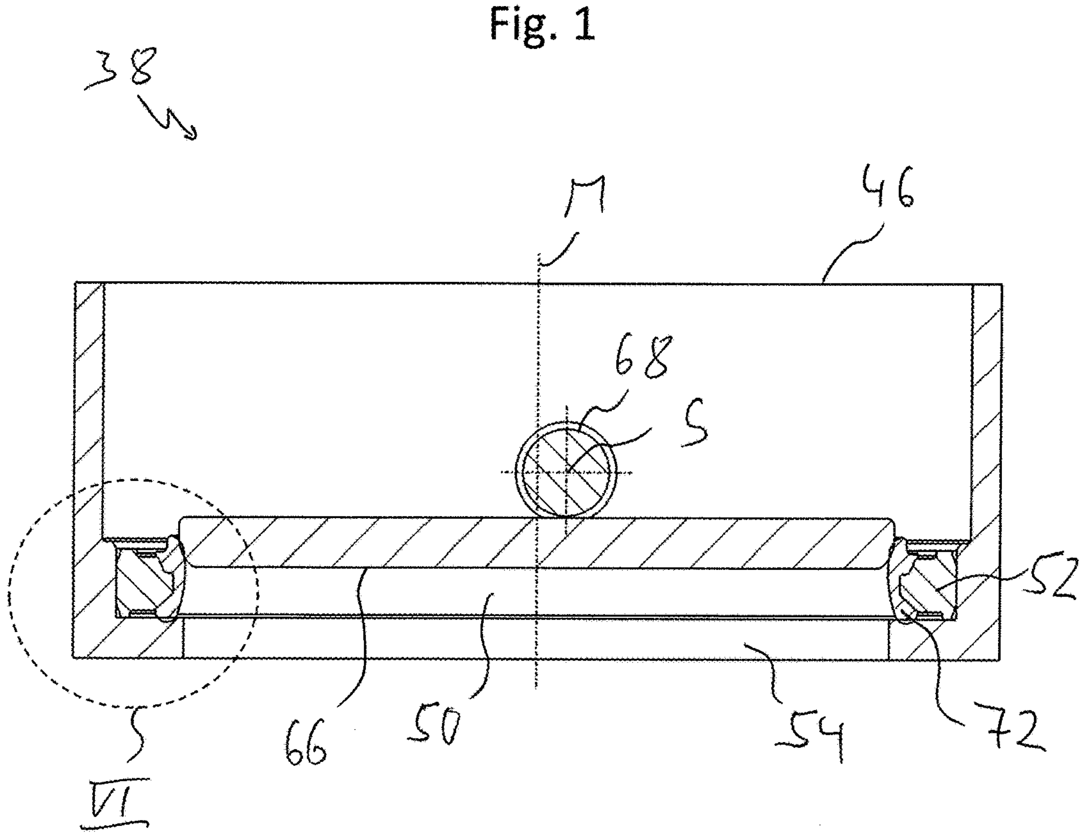
FIG. 2 is a longitudinal-section view of the valve, corresponding to FIG. 1.
Figure 3:
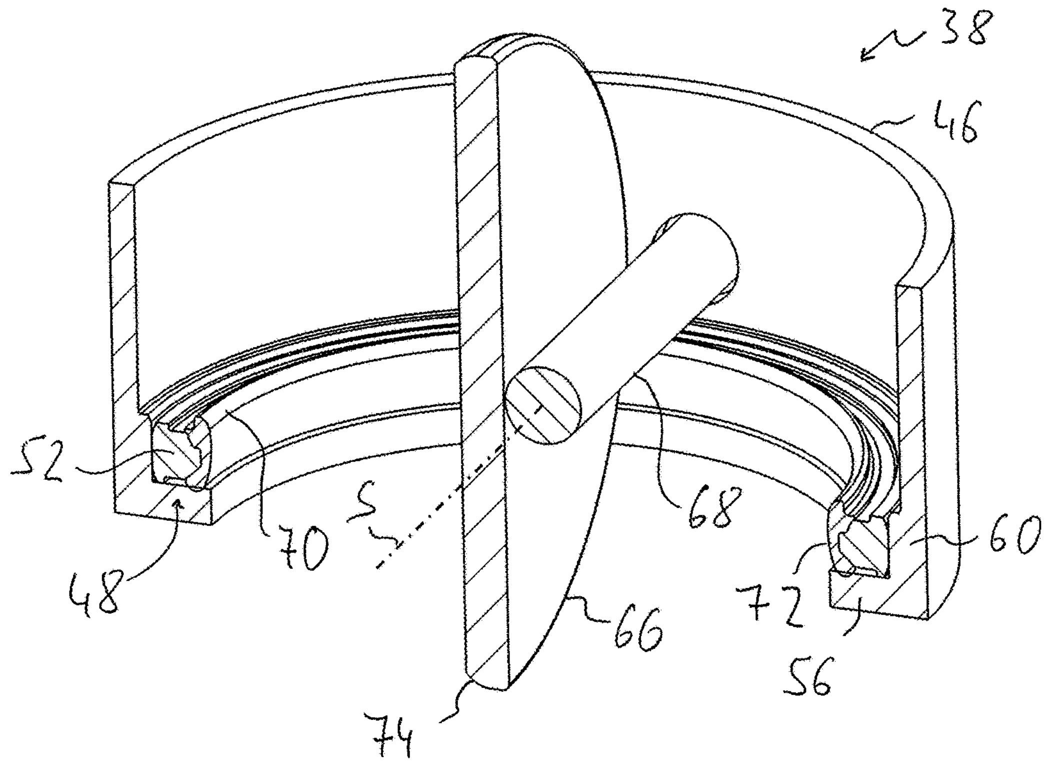
FIG. 3 is a perspective longitudinal-section view of the valve, with the valve element in an open position.
Figure 4:
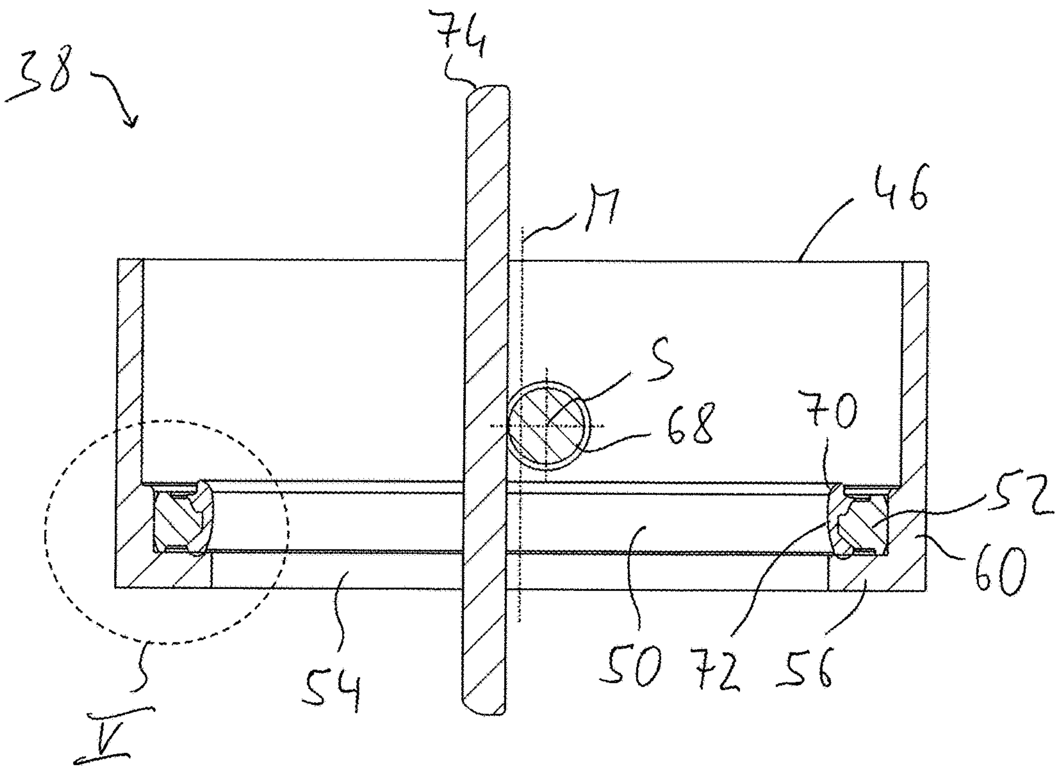
FIG. 4 is a longitudinal-section view of the valve, corresponding to FIG. 3.

The valve 38, which is shown in a closed position in FIGS. 1 and 2 and in an open position in FIGS. 3 and 4, includes a valve housing 46, which, for example, is tubular and in which a valve seat labeled in general with 48 is borne. The valve seat 48 includes a valve-seat support element 52 which annularly surrounds, for example as a circular ring, a valve-opening center axis M of a valve opening 50. The valve-seat support element 52 is made of substantially rigid material. For example, metal material or hard plastic can be used for this purpose. The valve-seat support element 52 is supported axially in the direction of the valve-opening center axis M on a step region 56 of the valve housing 46, which step region surrounds a housing opening 54 of the valve housing 46. The valve-seat support element 52 is supported, at an outer circumferential region 58 thereof, radially outward on a portion 60 of the valve housing 46, which portion is, for example, essentially cylindrical. A firm connection between the valve-seat support element 52 and the valve housing 46 can be achieved by press fit. In order to facilitate the insertion of the valve-seat support element 52 into the essentially cylindrical portion 60, the valve-seat support element 52 can have a chamfer 62 at least on its axial end region which leads during insertion in the axial direction. The essentially cylindrical portion 60 of the valve housing 46 can also have such a chamfer 64.

The essentially cylindrical portion 60 can be slightly conical and, in the insertion direction, tapered, so that an increased press-fit effect can be achieved. Alternatively or in addition, the firm connection between the valve-seat support element 52 and the valve housing 46 can be achieved by material bonding. Depending on the construction material of the valve-seat support element 52 and of the valve housing 46, this can be accomplished, for example, by welding, soldering or gluing.

The valve 38 also includes a discoid valve element 66. The valve element 66 is firmly supported in the valve housing 46 on a pivot shaft 68 which can be rotated about a pivot axis S. By rotation of the pivot shaft 68 about the pivot axis S, the valve element 66 can be pivoted between the closed position, which is shown in FIGS. 1 and 2 and in which the valve element is oriented essentially orthogonally to the valve-opening center axis M and a valve-element center axis essentially corresponds to the valve-opening center axis M, and the open position, which is shown in FIGS. 3 and 4 and in which the discoid valve element 66 is oriented essentially parallel to the valve-opening center axis M.

The valve 38 or the valve element 66 is doubly eccentric. This means that the pivot axis S of the pivot shaft 68 is radially offset with respect to the valve-opening center axis M and is preferably parallel thereto and is offset axially in the direction of the valve-opening center axis M with respect to a valve-seat sealing face 70 of a valve-seat sealing element 72 firmly supported on the valve-seat support element 52, which valve-seat sealing face is explained in detail below. As a result of this doubly eccentric positioning of the pivot axis S, the situation is avoided in which the region of the valve-seat sealing element 72 having the sealing face 70 and a region of the valve element 66 providing a valve-element sealing face 74 interact in a way that leads to excessive wear on the valve-seat sealing element 72, which is made of elastic material, for example rubber material.

Figure 5:
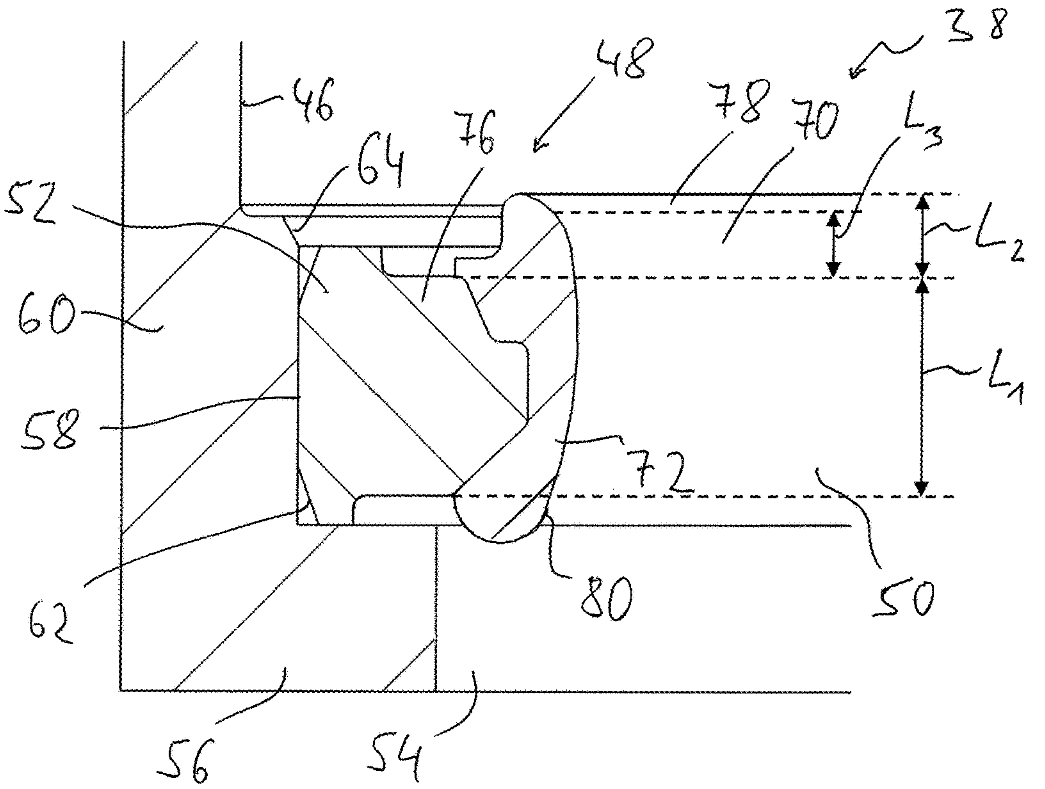
FIG. 5 shows the detail V in FIG. 4, enlarged.
Figure 6:
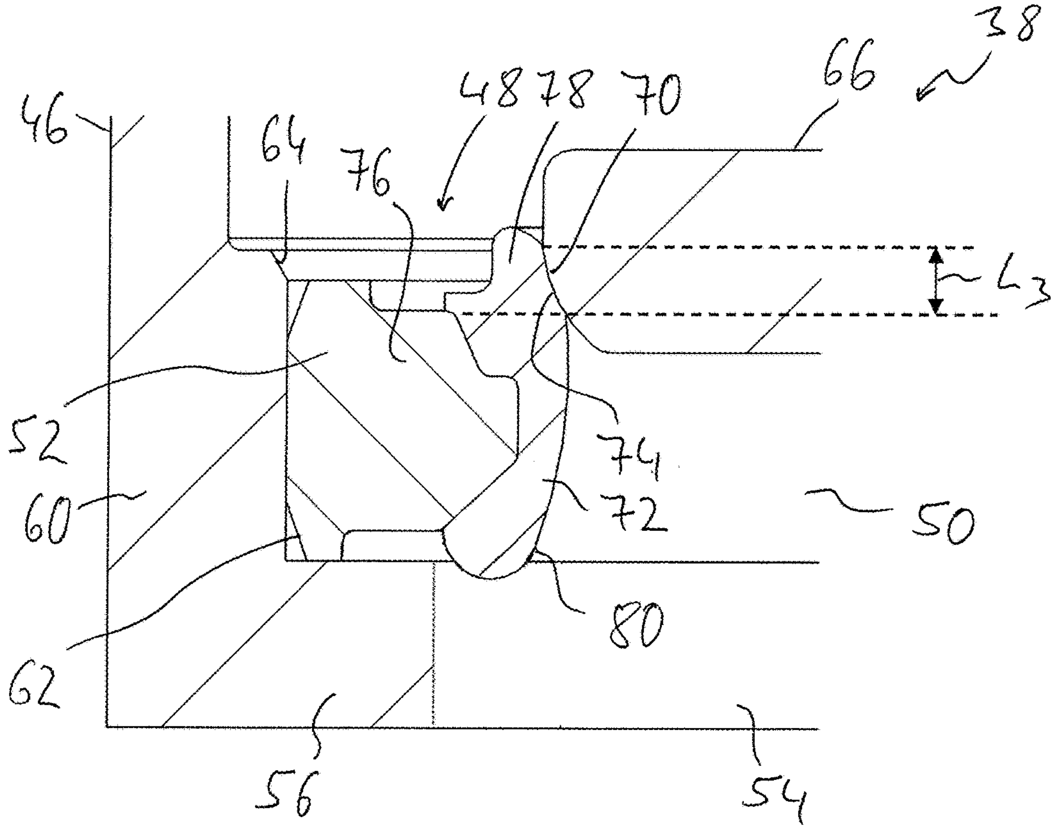
FIG. 6 shows the detail VI in FIG. 2, enlarged.

The valve-seat sealing element 72, which is shown in more detail in FIG. 5, can be fixed on the valve-seat support element 52, for example by material bonding. This material bonding can be achieved, for example, by gluing or by molding-on or by vulcanization.

For the connecting of the valve-seat sealing element 72, the valve-seat support element 52 has a support-element body portion 76, the axial extent of which is less than the maximum axial extent of the valve-seat support element 52. The support-element body portion 76 thus extends in an axial length portion $L_1$ of the valve seat 48, which axial length portion can be seen in FIG. 5.

The valve-seat sealing element 72 extends axially over this length portion $L_1$ and is supported radially outward in the axial region of extent of this length portion $L_1$ by the support-element body portion 76.

The valve-seat sealing element 72 has, in its axial end region close to the pivot axis S, a sealing portion 78 which axially protrudes beyond the support-element body portion 76 in a length portion L2 of the valve seat 48. In the region of the length portion L2 or of the sealing portion 78, the valve-seat sealing element 72 is not supported radially outward by direct supporting interaction with the valve-seat support element 52 or with the support-element body portion 76.

It is pointed out that, also in its other axial end region, the valve-seat sealing element 72 can have a sealing-element portion 80 which axially protrudes, in the manner of a bead, beyond the support-element body portion 76.

The valve-seat sealing face 70 formed on the valve-seat sealing element 72 lies essentially completely within the length portion $L_2$ and essentially does not axially overlap with the length portion $L_1$. This means that the valve-seat sealing face 70, which is in sealing interaction with the sealing face 74 of the valve element 66 when the valve element 66 is in the closed position, lies, in the direction of the valve-opening center axis M, outside of the axial region of extent of the support-element body portion 76 and thus in a region of the valve-seat sealing element 72 which the valve-seat support element 52 and in particular the support-element body portion 76 does not directly support or block to prevent movement radially outward.

Because of this positioning of the valve-seat sealing face 70 axially at an offset with respect to and, in the embodiment shown, directly adjacently to the support-element body portion 76, the valve-seat sealing element 72 is comparatively easily deformable radially outward during the establishing and also during the ending of the closed state of the valve element 66, because, in the entire axial region of extent of the valve-seat sealing face 70, the valve-seat sealing element 72 is not blocked by other components to prevent movement radially outward. Thus, wear on the valve-seat sealing element 72 due to the interaction between the valve element 66 and the valve-seat sealing element 72 is minimized. At the same time, the valve-seat sealing element 72 can be shaped such that, because of the improved radial deformability in the length portion L2, the valve-seat sealing element can better nestle against the valve-element sealing face 74 of the valve element 66 when the valve element is in the closed position, such that an improved sealing effect can be achieved.

Figure 7:
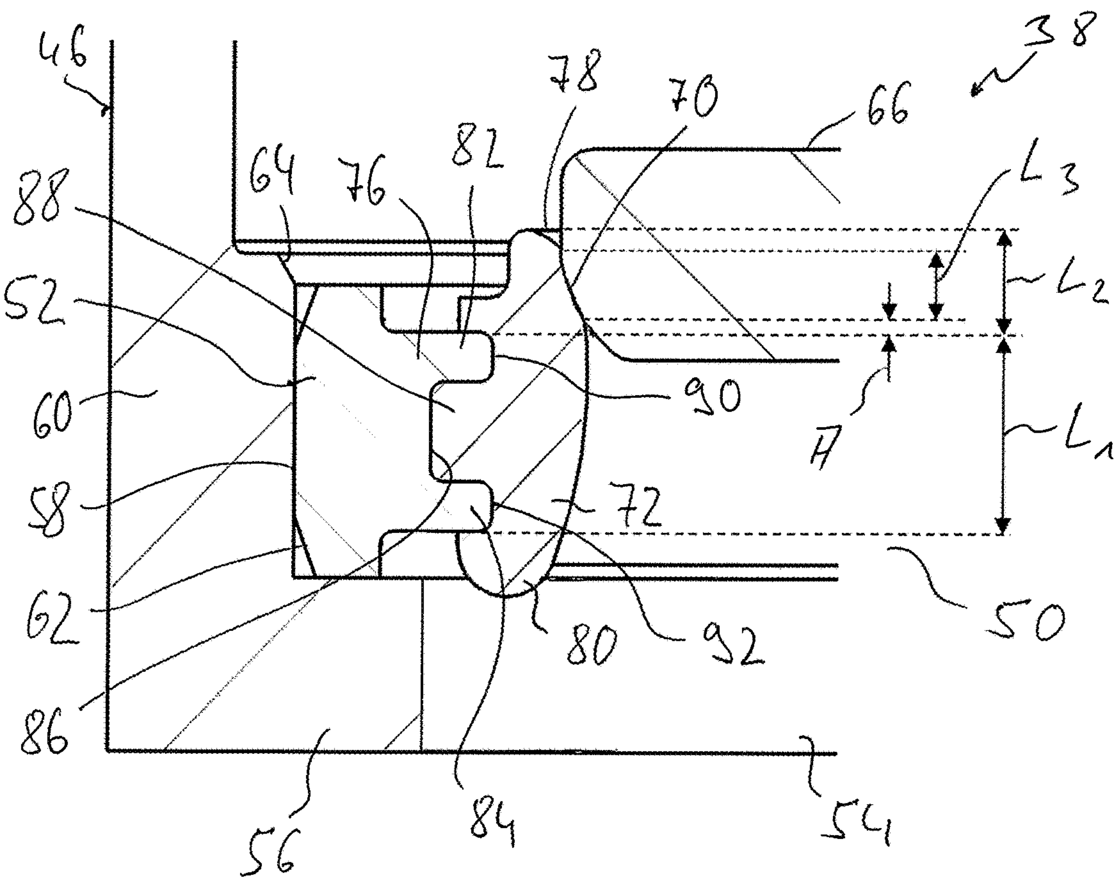
FIG. 7 is a view of an alternative embodiment of the valve, the view corresponding to FIG. 6; and, FIG. 8 is a principle-type illustration of a fuel cell system.

In an alternative embodiment of the valve 38 which is shown in FIG. 7, the valve-seat sealing face 70 is positioned in the length portion $L_2$ such that there is an axial distance A between the length portion $L_3$, that is, the valve-seat sealing face 70, and the length portion $L_1$, that is, the support-element body portion 76. This leads to even better radial deformability of the valve-seat sealing element 72 in the region of its valve-seat sealing face 70.

In the embodiment of the valve 38 which is shown in FIG. 7, the valve-seat support element 52 has, on the radial inside in its support-element body portion 76, a radially inwardly open recess 86 axially delimited by two protrusions 82, 84 which protrude radially inward and preferably extend completely around the valve-opening center axis M. The valve-seat sealing element 72 has a protrusion 88 which protrudes radially outwardly and which engages in and preferably completely fills up the recess 86. On both sides of the protrusion 88, radially outwardly open recesses 90, 92 which receive the protrusions 82, 84 are formed. The valve-seat sealing element 72 thus surrounds the protrusions 82, 84 on their axially oriented sides by means of the sealing portion 78 on one side and by means of the sealing-element portion 80 on the other side.

With this structure of the valve-seat support element 52, the mutually engaging protrusions and recesses generate a comparatively large surface at which the valve-seat sealing element 72 and the valve-seat support element 52 are in contact with one another and preferably are fastened to one another by material bonding. This ensures a durable, stable and in particular gas-tight connection of the valve-seat sealing element 72 to the valve-seat support element 52 even in the case of frequently performed pivoting operations of the valve element 66.

In principle, according to the present disclosure there can also be a slight axial overlap between the length portion $L_3$, that is, the valve-seat sealing face 70, and the length portion $L_1$, that is, the support-element body portion 76, if this overlap does not impair the radial deformability of the valve-seat sealing element 72 in the region of its valve-seat sealing face. Such an overlap should not exceed a value of, for example, approximately 5% of the axial extent of the length portion $L_3$.

In order to achieve a defined sealing interaction between the valve element 66 and the valve seat 48, the pivot shaft 68 can, on both sides of the valve element 66 in the direction of the pivot axis S, be rotatably supported at the valve housing 46. Such support of the pivot shaft 68 on both sides likewise contributes, in particular in connection with the shaping of the valve-seat sealing element 72 as described in detail above, to an improved sealing interaction and, as a result of defined movement conditions, to reduced wear on the valve-seat sealing element 72.

In order to minimize, during movement of the valve element 66 between its open position and its closed position, the frictional interaction with the valve-seat sealing element 72 in the valve 38 or 40 described above, the valve element 66 can be at least partly, preferably completely, made of, for example coated with, friction-reducing material in particular in the region of its valve-element sealing face 74 or in all surface regions that come into contact with the valve-seat sealing element 72 in the course of this movement. Such material used can be, for example, Teflon material known under the tradename or registered trademark.

It is understood that the foregoing description is that of the preferred embodiments of the invention and that various changes and modifications may be made thereto without departing from the spirit and scope of the invention as defined in the appended claims.

The invention claimed is:

1. A valve comprising:

a discoid valve element pivotable about a pivot axis between an open position and a closed position;

said discoid valve element having an outer circumferential region defining an annular valve-element sealing face;

an annular valve seat surrounding a valve opening and having an inner circumferential region defining a valve-seat sealing face annularly surrounding a valve-opening center axis and being in contact with said valve-element sealing face when said discoid valve element is in said closed position;

said annular valve seat including an annular valve-seat support element and an annular valve-seat sealing element supported on said valve-seat support element;

said valve-seat sealing face being arranged on said valve-seat sealing element;

said valve-seat support element including a support-element body portion supporting said valve-seat sealing element to prevent movement radially outward with respect to said valve-opening center axis;

said valve-seat sealing element including, on one axial side of said support-element body portion, a sealing portion protruding beyond said support-element body portion axially with respect to said valve-opening center axis, said sealing portion of said valve-seat sealing element being not supported radially outwardly by direct supporting interaction with said support-element body portion of said valve-seat support element;

all of said valve-seat sealing face being formed on said sealing portion, so that said valve-seat sealing face does not axially overlap with said support-element body portion of said valve-seat support element; and said valve-seat sealing face axially directly adjoining said support-element body portion, so that there is no axial distance between said support-element body portion of said valve-seat support element and said valve seat sealing face.

2. The valve of claim 1, wherein an axial length of extent of said support-element body portion is less than a maximum axial length of extent of said valve-seat support element.

3. The valve of claim 1, further comprising:

a valve housing wherethrough gas flows when said discoid valve element is in said open position; and, said valve-seat support element being supported in said valve housing.

4. The valve of claim 3, wherein said valve-seat support element is held in said valve housing by at least one of press fit and material bonding.

5. The valve of claim 3, wherein at least one of the following applies:

i) a chamfer is provided on said valve housing; and, ii) a chamfer is provided on an outer circumferential region of said valve-seat support element in at least one axial end region.

6. The valve of claim 1, wherein said pivot axis is radially offset with respect to said valve-opening center axis and is offset axially in a direction of said valve-opening center axis with respect to said valve-seat sealing face.

7. The valve of claim 1, wherein said valve-seat support element is made of rigid material and said valve-seat sealing element is made of elastic material.

8. The valve of claim 7, wherein said valve-seat support element is made of metal material or plastic material and said valve-seat sealing element is made of rubber.

9. The valve of claim 1, wherein:

one element of said valve-seat support element and said valve-seat sealing element includes:

at least two protrusions which:

i) are arranged at a distance from one another in a direction of said valve-opening center axis;

ii) protrude radially toward the other element of said valve-seat support element and said valve-seat sealing element; and;

iii) form a recess therebetween; and, wherein the other element of said valve-seat support element and said valve-seat sealing element includes, in association with said recess, a protrusion engaging in said recess.

10. The valve of claim 1, wherein said valve element is, at least in its surface region that comes into contact with the valve-seat sealing element, made of friction-reducing material at least in parts.

11. The valve of claim 10, wherein said friction-reducing material is PTFE material.

12. The valve of claim 1, wherein the valve is for a fuel cell system.

13. A fuel cell system comprising:

a fuel cell unit and at least one valve for selectively blocking and releasing a gas flow to and/or from the fuel cell unit;

said at least one valve including:

a discoid valve element pivotable about a pivot axis between an open position and a closed position;

said discoid valve element having an outer circumferential region defining an annular valve-element sealing face;

an annular valve seat surrounding a valve opening and having an inner circumferential region defining a valve-seat sealing face annularly surrounding a valve-opening center axis and being in contact with said valve-element sealing face when said discoid valve element is in said closed position;

said annular valve seat including an annular valve-seat support element and an annular valve-seat sealing element supported on said valve-seat support element;

said valve-seat sealing face being arranged on said valve-seat sealing element;

said valve-seat support element including a support-element body portion supporting said valve-seat sealing element to prevent movement radially outward with respect to said valve-opening center axis;

said valve-seat sealing element including, on one axial side of the support-element body portion, a sealing portion protruding beyond said support-element body portion axially with respect to said valve-opening center axis, said sealing portion of said valve-seat sealing element being not supported radially outwardly by direct supporting interaction with said support-element body portion of said valve-seat support element;

all of said valve-seat sealing face being formed on said sealing portion so that said valve-seat sealing face does not axially overlap with said support-element body portion of said valve-seat support element; and said valve-seat sealing face axially directly adjoining said support-element body portion, so that there is no axial distance between said support-element body portion of said valve-seat support element and said valve seat sealing face.

14. The fuel cell system of claim 13, wherein said fuel cell unit comprises:

an anode region having an anode-gas feed region;

an anode-exhaust-gas discharge region;

a cathode region having a cathode-gas feed region and a cathode-exhaust-gas discharge region; and, wherein at least one of the following applies:

i) said cathode-gas feed region includes said valve; and, ii) said cathode-exhaust-gas discharge region includes said valve.

* * * * *